US007366708B2

(12) United States Patent
Jalali et al.

(10) Patent No.: US 7,366,708 B2
(45) Date of Patent: Apr. 29, 2008

(54) MECHANISM TO EFFICIENTLY INDEX STRUCTURED DATA THAT PROVIDES HIERARCHICAL ACCESS IN A RELATIONAL DATABASE SYSTEM

(75) Inventors: Neema Jalali, Belmont, CA (US); Eric Sedlar, San Francisco, CA (US); Nipun Agarwal, Santa Clara, CA (US); Ravi Murthy, Fremont, CA (US)

(73) Assignee: Oracle Corporation, Redwood Shores, CA (US)

( * ) Notice: Subject to any disclaimer, the term of this patent is extended or adjusted under 35 U.S.C. 154(b) by 175 days.

(21) Appl. No.: 10/260,381

(22) Filed: Sep. 27, 2002

(65) Prior Publication Data

US 2003/0033285 A1 Feb. 13, 2003

Related U.S. Application Data (63) Continuation-in-part of application No. 10/171,728, filed on May 28, 2002, now Pat. No. 6,571,231, and a continuation-in-part of application No. 09/251,757, filed on Feb. 18, 1999, now Pat. No. 6,427,123.

(60) Provisional application No. 60/378,800, filed on May 7, 2002, provisional application No. 60/326,052, filed on Sep. 28, 2001.

(51) Int. Cl.
*G06F 7/00* (2006.01)
*G06F 17/30* (2006.01)

(52) U.S. Cl. .................... 707/1; 707/2; 707/9
(58) Field of Classification Search ......... 707/1–104.1, 707/202; 726/2
See application file for complete search history.

(56) References Cited

U.S. PATENT DOCUMENTS 5,295,261 A 3/1994 Simonetti .............. 395/600

(Continued)

FOREIGN PATENT DOCUMENTS

GB 2409078 A 6/2005

(Continued)

OTHER PUBLICATIONS

Marcus Jurgens and Hans-J. Lenz (1999), PISA: Performance Models for Index Structures with and without Aggregated data, pp. 78-87.*

(Continued)

*Primary Examiner*—Wilson Lee
*Assistant Examiner*—Merilyn P Nguyen
(74) *Attorney, Agent, or Firm*—Hickman Palermo Truong & Becker LLP (57) ABSTRACT

Described is a hierarchical index that captures the hierarchical relationship of a hierarchy emulated by a relational database system. The hierarchical index is implemented, using a database table which contains rows that serve as entries of the hierarchical index. Another table has rows that are associated with nodes in the hierarchy. Each entry in the hierarchal index maps to a row that corresponds to a node in the hierarchy. A node in the hierarchy may be a parent node with one or more child nodes. In this case, the corresponding entry in the hierarchical index contains identifiers which identify other entries in the index, where the other entries correspond to rows associated with child nodes of the parent node.

10 Claims, 5 Drawing Sheets

| | IRowID | NODE ID KEY | CHILD IDs | AccInfo |
|---|---|---|---|---|
| 408 → | r1 | 1 | {"b",r2,R2},{"c",r3,R3} | a1 |
| 412 → | r2 | 2 | {"d",,R4},{"e",,R5} | a2 |
| 414 → | r3 | 3 | {"f",,R6},{"a",,R7} | a3 |

402

U.S. PATENT DOCUMENTS

| | | | |
|---|---|---|---|
| 5,404,513 A * | 4/1995 | Powers et al. ............... | 707/102 |
| 5,467,471 A | 11/1995 | Bader ......................... | 395/600 |
| 5,625,815 A | 4/1997 | Maier et al. | |
| 5,630,125 A * | 5/1997 | Zellweger ................ | 707/103 R |
| 5,643,633 A | 7/1997 | Telford et al. | |
| 5,680,614 A | 10/1997 | Bakuya et al. .......... | 707/103 R |
| 5,724,577 A | 3/1998 | Exley et al. ................ | 395/611 |
| 5,734,887 A | 3/1998 | Kingberg et al. ........... | 395/604 |
| 5,878,415 A | 3/1999 | Olds | |
| 5,960,194 A | 9/1999 | Choy et al. | |
| 5,974,407 A * | 10/1999 | Sacks ............................ | 707/2 |
| 5,983,215 A | 11/1999 | Ross et al. | |
| 5,987,506 A | 11/1999 | Carter et al. | |
| 6,038,563 A | 3/2000 | Bapat et al. | |
| 6,055,544 A * | 4/2000 | DeRose et al. .......... | 707/104.1 |
| 6,061,684 A | 5/2000 | Glasser et al. | |
| 6,128,610 A * | 10/2000 | Srinivasan et al. ............ | 707/3 |
| 6,141,655 A * | 10/2000 | Johnson et al. ................ | 707/2 |
| 6,154,741 A | 11/2000 | Feldman | |
| 6,199,195 B1 | 3/2001 | Goodwin et al. | |
| 6,208,993 B1 * | 3/2001 | Shadmon .................... | 707/102 |
| 6,236,988 B1 | 5/2001 | Aldred | |
| 6,263,332 B1 | 7/2001 | Nasr et al. | |
| 6,269,380 B1 | 7/2001 | Terry et al. | |
| 6,279,006 B1 | 8/2001 | Shigemi et al. | |
| 6,279,007 B1 * | 8/2001 | Uppala ....................... | 707/101 |
| 6,298,349 B1 | 10/2001 | Toyoshima et al. | |
| 6,330,573 B1 | 12/2001 | Salisbury et al. | |
| 6,341,289 B1 | 1/2002 | Burroughs et al. | |
| 6,343,287 B1 | 1/2002 | Kumar et al. | |
| 6,356,920 B1 | 3/2002 | Vandersluis | |
| 6,366,902 B1 * | 4/2002 | Lyle et al. ...................... | 707/2 |
| 6,366,934 B1 | 4/2002 | Cheng et al. | |
| 6,370,537 B1 | 4/2002 | Gilbert et al. .............. | 707/101 |
| 6,381,607 B1 * | 4/2002 | Wu et al. ................... | 707/100 |
| 6,427,123 B1 | 7/2002 | Sedlar | |
| 6,438,562 B1 | 8/2002 | Gupta et al. | |
| 6,470,344 B1 * | 10/2002 | Kothuri et al. ............. | 707/100 |
| 6,487,546 B1 * | 11/2002 | Witkowski .................... | 707/1 |
| 6,496,842 B1 * | 12/2002 | Lyness ....................... | 715/514 |
| 6,539,398 B1 | 3/2003 | Hannan et al. | |
| 6,571,231 B2 | 5/2003 | Sedlar ........................... | 707/1 |
| 6,609,121 B1 | 8/2003 | Ambrosini et al. | |
| 6,631,366 B1 * | 10/2003 | Nagavamsi et al. ........... | 707/3 |
| 6,642,946 B1 | 11/2003 | Janes et al. | |
| 6,643,633 B2 | 11/2003 | Chau et al. | |
| 6,654,734 B1 | 11/2003 | Mani et al. | |
| 6,684,227 B2 | 1/2004 | Duxbury | |
| 6,704,739 B2 | 3/2004 | Craft et al. | |
| 6,704,747 B1 | 3/2004 | Fong | |
| 6,708,186 B1 | 3/2004 | Claborn et al. | |
| 6,718,322 B1 | 4/2004 | Brye ............................ | 707/3 |
| 6,725,212 B2 | 4/2004 | Couch et al. ................. | 707/2 |
| 6,732,222 B1 | 5/2004 | Garritsen et al. | |
| 6,754,661 B1 | 6/2004 | Hallin et al. ................ | 707/100 |
| 6,772,350 B1 * | 8/2004 | Belani et al. ................. | 726/2 |
| 6,778,977 B1 | 8/2004 | Avadhanam et al. | |
| 6,782,380 B1 | 8/2004 | Thede | |
| 6,785,673 B1 | 8/2004 | Fernandez et al. | |
| 6,795,821 B2 | 9/2004 | Yu | |
| 6,826,727 B1 | 11/2004 | Mohr et al. | |
| 6,836,778 B2 | 12/2004 | Manikutty et al. | |
| 6,836,857 B2 | 12/2004 | Ten-Hove et al. | |
| 6,920,457 B2 | 7/2005 | Pressmar | |
| 6,965,894 B2 * | 11/2005 | Leung et al. ................. | 707/10 |
| 7,031,956 B1 | 4/2006 | Lee et al. | |
| 7,043,488 B1 * | 5/2006 | Baer et al. .................. | 707/101 |
| 7,047,253 B1 | 5/2006 | Murthy et al. | |
| 7,062,507 B2 | 6/2006 | Wang et al. | |
| 7,089,239 B1 * | 8/2006 | Baer et al. ...................... | 707/6 |
| 7,139,746 B2 | 11/2006 | Shin et al. | |
| 7,162,485 B2 | 1/2007 | Gottlob et al. | |
| 7,181,438 B1 | 2/2007 | Szabo | |
| 2002/0073019 A1 | 6/2002 | Deaton | |
| 2002/0078068 A1 | 6/2002 | Krishnaprasad et al. | |
| 2002/0099715 A1 | 7/2002 | Jahnke et al. | |
| 2002/0103829 A1 | 8/2002 | Manning et al. | |
| 2002/0116457 A1 | 8/2002 | Eshleman et al. | |
| 2002/0123993 A1 | 9/2002 | Chau et al. | |
| 2002/0143512 A1 | 10/2002 | Shamoto et al. | |
| 2002/0156772 A1 | 10/2002 | Chau et al. | |
| 2002/0156811 A1 | 10/2002 | Krupa | |
| 2002/0184188 A1 | 12/2002 | Mandyam et al. | |
| 2002/0188613 A1 | 12/2002 | Chakraborty et al. | |
| 2002/0194157 A1 | 12/2002 | Zait et al. | |
| 2003/0004937 A1 | 1/2003 | Salmenkaita et al. | |
| 2003/0009361 A1 * | 1/2003 | Hancock et al. ............... | 705/7 |
| 2003/0065659 A1 | 4/2003 | Agarwal et al. ............... | 707/4 |
| 2003/0078906 A1 | 4/2003 | Ten-Hove et al. | |
| 2003/0093672 A1 | 5/2003 | Cichowlas | |
| 2003/0101194 A1 | 5/2003 | Rys et al. .................... | 707/101 |
| 2003/0105732 A1 * | 6/2003 | Kagalwala et al. ............ | 707/1 |
| 2003/0131051 A1 | 7/2003 | Lection et al. | |
| 2003/0182624 A1 | 9/2003 | Large | |
| 2003/0212662 A1 | 11/2003 | Shin et al. ...................... | 707/2 |
| 2003/0212664 A1 | 11/2003 | Breining et al. | |
| 2003/0233618 A1 | 12/2003 | Wan | |
| 2004/0010752 A1 | 1/2004 | Chan et al. | |
| 2004/0043758 A1 | 3/2004 | Sorvari et al. | |
| 2004/0064466 A1 | 4/2004 | Manikutty et al. | |
| 2004/0088320 A1 | 5/2004 | Perry | |
| 2004/0148278 A1 | 7/2004 | Milo et al. | |
| 2004/0176958 A1 | 9/2004 | Salmenkaita et al. | |
| 2004/0205551 A1 | 10/2004 | Santos | |
| 2004/0215600 A1 | 10/2004 | Aridor et al. | |
| 2004/0220912 A1 | 11/2004 | Manikutty et al. | |
| 2004/0221226 A1 | 11/2004 | Lin et al. | |
| 2004/0225680 A1 | 11/2004 | Cameron et al. | |
| 2004/0230667 A1 | 11/2004 | Wookey | |
| 2004/0267760 A1 | 12/2004 | Brundage et al. | |
| 2005/0038688 A1 | 2/2005 | Collins et al. | |
| 2005/0050016 A1 | 3/2005 | Stanoi et al. | |
| 2005/0050058 A1 | 3/2005 | Jain et al. | |
| 2005/0050092 A1 | 3/2005 | Jain et al. | |
| 2005/0091178 A1 | 4/2005 | Pal et al. | |
| 2005/0097084 A1 | 5/2005 | Balmin et al. | |
| 2005/0102256 A1 | 5/2005 | Bordawekar et al. | |
| 2005/0114314 A1 | 5/2005 | Fan et al. | |
| 2005/0160108 A1 | 7/2005 | Charlet et al. | |
| 2005/0228818 A1 | 10/2005 | Murthy et al. | |
| 2005/0289125 A1 | 12/2005 | Liu et al. | |
| 2005/0289138 A1 | 12/2005 | Cheng et al. | |
| 2006/0129584 A1 | 6/2006 | Hoang et al. | |

FOREIGN PATENT DOCUMENTS

| | | |
|---|---|---|
| WO | WO 00/49533 A2 | 8/2000 |
| WO | WO 42881 A2 | 6/2001 |
| WO | WO 01/59602 A1 | 8/2001 |
| WO | WO 01/61566 A1 | 8/2001 |
| WO | WO 03/027908 A2 | 4/2003 |

OTHER PUBLICATIONS

R. Bourret, et al., "A Generic Load/Extract Utility For Data Transfer Between XML Documents and Relational Databases," Proc. Second International Workshop on Advanced Issues of E-Commerce and Web-Based Information Systems, IEEE Computing Society, Jun. 8-9, 2000, pp. 134-143.

S. Vorthmann, et al. "Beyond Schemas, Schema Adjuncts and the Outside World," Markup Languages, Online!, vol. 2, No. 3, Jun. 2000, pp. 1-8.

Mi-Ok Chae, et al., "Design and Implementation of an Object-Oriented Multimedia DBMS Tightly Coupled with Information Retrieval Functions," Proc. 17th IASTED International Conference on Applied Informatics, Feb. 15-18, 1999, abstract.

Josephine Cheng, et al., "IBM DB2 XML Extender," IEEE, ICDE '00 Conference, San Diego, Feb. 2000, 128 pages.

Hansrudi Noser, et al., "Dynamic 3D Visualization of Database-Defined Tree Structures on the WWW by Using Rewriting Systems," 2000, IEEE, XP-002262516, pp. 247-254.

Chen, Ruey-Shun et al., "Developing an XML framework for metadata system", Trinity College Dublin, Proc. of the 1st Inter. Sympo. on Information and Communication, pp. 267-272.

Manolescu, Dragos, Review of "Metadata solutions: using metamodels, repositories, XML, and enterprise portals to generate information on demand by Adrienne Tannenbaum", Mar. 2003, ACM Press, vol. 28, Issue 2, p. 38.

Peng, Feng et al., "XPath queries on streaming data" (2003) *ACM Press*, pp. 431-442.

Vion-Dury, Jean-Yves, "XPath on left and right sides of rules: toward compact XML tree rewriting through node patterns" (2003) *ACM Press*, pp. 19-25.

Lo et al., "XAS: A System for Accessing Componentized, Virtual XML Documents," IEEE, 2001, pp. 493-502. (Reference located on enclosed CD-ROM).

Zisman et al., "Using XML to Build Consistency Rules for Distributed Specifications," Proceedings of the Tenth International Workshop on Software Specification and Design (IWSD'00), IEEE 2000, 8 pages. (Reference located on enclosed CD-ROM).

Myllymaki, Jussi, "Effective Wed data Extraction with Standard XML Technologies," WWW10, May 1-5, 2001, pp. 689-696. (Reference located on enclosed CD-ROM).

Schmidt et al., "Why and How to Benchmark XML Databases," SIGMOND Record, vol. 3, No. 3, Sep. 2001, pp. 27-32. (Reference located on enclosed CD-ROM).

McHugh, Jason et al., "Query Optimization for XML", XP-002333353, *Proceedings of the 25th VLDB Conference* (1999) pp. 315-326.

Yoshikawa, Masatoshi et al., "XRel: A Path-Based Approach to Storage and Retrieval of XML Documents Using Relational Databases", XP-001143686, *ACM Transactions on Internet Technology* (2001), pp. 110-141.

Notification of Transmittal of the International Search Report and the Written Opinion of the International Searching Authority, or the Declaration received from International application No. PCT/US2005/011762.

Pending claims from International application No. PCT/US2005/011762.

International Searching Authority, "Notification of Transmittal of the International Search Report and the Written Opinion of the International Searching Authority, or the Declaration," PCT/US2005/011763, dated Aug. 6, 2005, 12 pages.

Current Claims, PCT/US2005/011763, 4 pages.

Cooper, Brian F. et al., "A Fast Index for Semistructured Data," Proceeding of the International Conference on Very Large Databases, 2001, XP-002303292, pp. 341-350.

McHugh, Jason, et al. "Indexing Semistructured Data," Stanford Science Department, 1998, XP-002248313, pp. 1-21.

State Inetellectual Property Office of P.R.C., "Notification of the First Office Action," App. No. 02819168.4, dated Apr. 21, 2006, 6 pages.

Current Claims, P.R.C. App. No. 02819168.4, 5 pages.

MacKenzie, David et al., GNU Findutils Version 4.1.2, Nov. 1994, 38 pages.

European Patent Office, "Communication Pursuant to Article 96(2) EPC," App. No. 00952215.2, dated Oct. 5, 2006, received on Oct. 13, 2006, 7 pages.

Amended Claims, EP App. 00952215.2, 26 pages.

U.S. Appl. No. 10/956,300, filed Sep. 30, 2004, Office Action Mailing Date May 31, 2007.

U.S. Appl. No. 11/056,312, filed Feb. 10, 2005, Office Action Mailing Date May 17, 2007.

U.S. Appl. No. 10/944,170, filed Sep. 16, 2004, Office Action Mailing Date May 17, 2007.

U.S. Appl. No. 10/944,171, filed Sep. 16, 2004, Office Action Mailing Date Apr. 19, 2007.

U.S. Appl. No. 11/034,490, filed Jan. 12, 2005, Office Action Mailing Date Apr. 23, 2007.

U.S. Appl. No. 11/014,502, filed Dec. 15, 2004, Office Action Mailing Date Mar. 28, 2007.

U.S. Appl. No. 10/884,311, filed Jul. 2, 2004, Office Action Mailing Date Apr. 17, 2007.

Chen, Ruey-Shun et al., "Developing an XML framework for metadata system", Trinity College Dublin, Proc. of the 1st Inter. Sympo. on Information and Communication, 2003, pp. 267-272, dated 2003.

* cited by examiner

| RRowID | NODE | DATA |
|---|---|---|
| R1 | 1 | D1 |
| R2 | 2 | D2 |
| R3 | 3 | D3 |
| R4 | 4 | D4 |
| R5 | 5 | D5 |
| R6 | 6 | D6 |
| R7 | 7 | D7 |

| PARENT | CHILD | CHILD NAME |
|---|---|---|
| 1 | 2 | b |
| 1 | 3 | c |
| 2 | 4 | d |
| 2 | 5 | e |
| 3 | 6 | f |
| 3 | 7 | a |

FIG. 4

| | IRowID | NODE ID KEY | CHILD IDs | AccInfo |
|---|---|---|---|---|
| 408 → | r1 | 1 | {"b",r2,R2},{"c",r3,R3} | a1 |
| 412 → | r2 | 2 | {"d",,R4},{"e",,R5} | a2 |
| 414 → | r3 | 3 | {"f",,R6},{"a",,R7} | a3 |

MECHANISM TO EFFICIENTLY INDEX STRUCTURED DATA THAT PROVIDES HIERARCHICAL ACCESS IN A RELATIONAL DATABASE SYSTEM

RELATED APPLICATIONS

The present application is a continuation-in-part application of U.S. patent application Ser. No. 10/171,728, filed by Eric Sedlar on May 28, 2002 now U.S. Pat. No. 6,571,231 and entitled "Maintenance of Hierarchical Index in a Relational System," the contents of which are hereby incorporated by reference in their entirety;

The present application is a continuation-in-part application of U.S. patent application Ser. No. 09/251,757, U.S. Pat. No. 6,427, 123 filed by Eric Sedlar on Feb. 18, 1999 and entitled Hierarchical Indexing for Accessing Hierarchically Organized Information in a Relational System, the contents of which are hereby incorporated by reference in their entirety, and which is co-pending with U.S. patent application Ser. No. 10/171,728 referenced above;

The present application claims priority from U.S. Provisional Patent Application No. 60/326,052, filed on Sep. 28, 2001, entitled File Based Access Provided With a Database System, by Eric Sedlar and Viswanathan Krishnamurthy;

The present application claims priority from U.S. Provisional Patent Application No. 60/378,800, filed on May 7, 2002, entitled SQL Access to Data that Provides a File System Abstraction, by Nipun Agarwal, Ravi Murthy, Eric Sedlar, Sivasankaran Chandrasekar, Fei Ge, Syam Pannala, Neema Jalali and Muralidhar Krishnaprasad.

The present application is also related to the following U.S. patent applications, the entire contents of which are incorporated herein by reference for all purposes:

U.S. patent application Ser. No. 10/260,138, filed on equal day herewith, entitled OPERATORS FOR ACCESSING HIERARCHICAL DATA IN A RELATIONAL SYSTEM, by NIPUN AGARWAL, RAVI MURTHY, ERIC SEDLAR, SIVASANKARAN CHAINDRASEKAR and FEI GE, now issued as U.S. Pat. No. 7,028.037;

U.S. patent application Ser. No. 10/260,384, filed on equal day herewith, entitled PROVIDING A CONSISTENT HIERARCHICAL ABSTRACTION OF RELATIONAL DATA, by NIPUN AGARWAL, ERIC SEDLAR, RAVI MURTHY and NAMIT JAIN, now issued as U.S. Pat. No. 7,051,033;

U.S. patent application Ser. No. 10/259,278, filed on equal day herewith, entitled MECHANISM FOR MAPPING XML SCHEMAS TO OBJECT-RELATIONAL DATABASE SYSTEMS, by RAVI MURTHY, MURALIDHAR KRISHNAPRASAD, SiVASANKARAN CHANDRASEKAR, ERIC SEDLAR, VISWANATHAN KRISHNAMURTHY and NIPIJN AGARWAL, now issued as U.S. Pat. No. 7,096,224;

U.S. patent application Ser. No. 10/260,161, filed on equal day herewith, entitled INDEXING TO EFFICIENTLY MANAGE VERSIONED DATA IN A DATABASE SYSTEM, by Nipun Agarwal, Eric Sedlar and Ravi Murthy, now issued as U.S. Pat. No. 7,047,250;

U.S. patent application Ser. No. 10/256,524, filed on equal day herewith, entitled MECHANISMS FOR STORING CONTENT ANT) PROPERTIES of Agarwal, and Neema Jalali, now issued as U.S. Pat. No. 7,047,253;

U.S. patent application Ser. No. 10/259,176, filed on equal day herewith, entitled MECHANISM FOR UNIFORM ACCESS CONTROL IN A DATABASE SYSTEM, by Ravi Murthy, Eric Sedlar, Nipun Agarwal, Sam Idicula, and Nicolas Montoya, now issued as U.S. Pat. No. 7,051,039;

U.S. patent application Ser. No. 10/256,777, filed on equal day herewith, entitled LOADABLE UNITS FOR LAZY MANIFESTATION OF XML DOCUMENTS by Syam Pannala, Eric Sedlar, Bhushan Khaladkar, Ravi Murthy, Sivasankaran Chandrasekar, and Nipun Agarwal, now issued as U.S. Pat. No. 7,092,967.

FIELD OF THE INVENTION

The present invention relates to relational database systems and, more specifically, to techniques for indexing hierarchical data within relational database systems.

BACKGROUND OF THE INVENTION

Humans tend to organize information in categories. The categories in which information is organized are themselves typically organized relative to each other in some form of hierarchy. For example, an individual animal belongs to a species, the species belongs to a genus, the genus belongs to a family, the family belongs to an order, and the order belongs to a class.

With the advent of computer systems, techniques for storing electronic information have been developed that largely reflected this human desire for hierarchical organization. Conventional computer file systems, for example, are typically implemented using hierarchy-based organization principles. Specifically, a typical file system has directories arranged in a hierarchy, and documents stored in the directories. Ideally, the hierarchical relationships between the directories reflect some intuitive relationship between the meanings that have been assigned to the directories. Similarly, it is ideal for each document to be stored in a directory based on some intuitive relationship between the contents of the document and the meaning assigned to the directory in which the document is stored.

Figure 1:
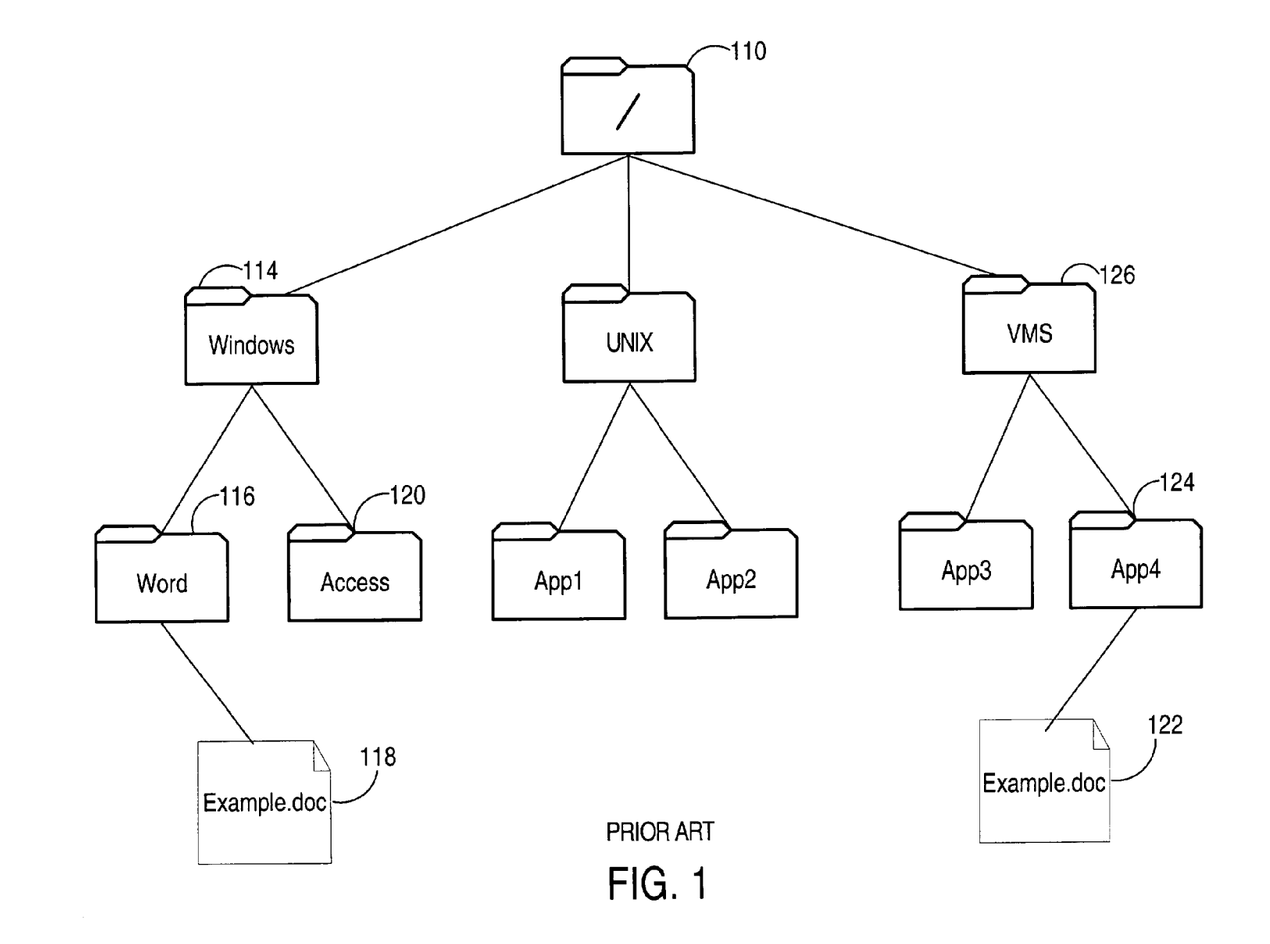
FIG. 1 is a block diagram illustrating a hierarchical file system.

FIG. 1 shows an example of a typical file system. The illustrated file system includes numerous directories arranged in a hierarchy. Two documents 118 and 122 are stored in the directories. Specifically, documents 118 and 122, both of which are entitled "Example.doc", are respectively stored in directories 116 and 124, which are respectively entitled "Word" and "App4".

In the directory hierarchy, directory 116 is a child of directory 114 entitled "Windows", and directory 114 is a child of directory 110. Similarly, directory 124 is a child of directory 126 entitled "VMS", and directory 126 is a child of directory 110. Directory 110 is referred to as the "root" directory because it is the directory from which all other directories descend. In many systems, the symbol "/" is used to refer to the root directory.

When electronic information is organized in a hierarchy, each item of information may be located by following a "path" through the hierarchy to the entity that contains the item. Within a hierarchical file system, the path to an item begins at the root directory and proceeds down the hierarchy of directories to eventually arrive at the directory that contains the item of interest. For example, the path to file 118 consists of directories 110, 114 and 116, in that order.

Hierarchical storage systems often allow different items to have the same name. For example, in the file system shown in FIG. 1, both of the documents 118 and 122 are entitled "Example.doc". Consequently, to unambiguously identify a given document, more than just the name of the document is required.

A convenient way to identify and locate a specific item of information stored in a hierarchical storage system is through the use of a "pathname". A pathname is a concise way of uniquely identifying an item based on the path through the hierarchy to the item. A pathname is composed of a sequence of names, referred to as path elements. In the context of a file system, each name in the sequence of names is a "filename". The term "filename" refers to both the names of directories and the names of documents, since both directories and documents are considered to be "files".

Within a file system, the sequence of filenames in a given pathname begins with the name of the root directory, includes the names of all directories along the path from the root directory to the item of interest, and terminates in the name of the item of interest. Typically, the list of directories to traverse is concatenated together, with some kind of separator punctuation (e.g., '/', '\', or ';') to make a pathname. Thus, the pathname for document 118 is /Windows/Word/Example.doc, while the pathname for document 122 is /VMS/App4/Example.doc.

The relationship between directories (files) and their contained content varies significantly between different types of hierarchically organized systems. One model, employed by various implementations, such as Windows and DOS file systems, requires each file to have exactly one parent, forming a tree. In a more complicated model, the hierarchy takes the form of a directed graph, where files can have multiple parents, as in the UNIX file system in which hard links are used.

In contrast to hierarchical approaches to organizing electronic information, a relational database stores information in tables comprised of rows and columns. Each row is identified by a unique RowID. Each column represents an attribute or field of a record, and each row represents a particular record. Data is retrieved from the database by submitting queries to a database server that manages the database. The queries must conform to the database language supported by the database server. Structured Query Language (SQL) is an example of a database language supported by many existing database management systems.

Each type of storage system has advantages and limitations. A hierarchically organized storage system is simple, intuitive, and easy to implement, and is a standard model used by most application programs. Unfortunately, the simplicity of the hierarchical organization does not provide the support required for complex data retrieval operations. For example, the contents of every directory may have to be inspected to retrieve all documents created on a particular day that have a particular filename. Since all directories must be searched, the hierarchical organization does nothing to facilitate the retrieval process.

A relational database system is well suited for storing large amounts of information and for accessing data in a very flexible manner. Relative to hierarchically organized systems, data that matches even complex search criteria may be easily and efficiently retrieved from a relational database system. However, the process of formulating and submitting queries to a database server is less intuitive than merely traversing a hierarchy of directories, and is beyond the technical comfort level of many computer users.

In the past, hierarchically organized systems and relationally organized systems have been implemented in different ways that were not compatible. However, some relationally organized systems incorporate features that allow the systems to emulate a hierarchically organized system. This type of emulation is especially desirable when the storage capability and flexibility of a relational system is needed, but the intuitiveness and ubiquity of the hierarchical system is desired.

One such feature is based on the connect-by clause defined by SQL. The connect-by clause allows a user to issue queries that request data based on a hierarchical organization. The data is returned by a relational database system in a way that reflects the hierarchical organization. The connect-by is used to specify the condition that defines the hierarchical relationship upon which the hierarchical organization is based.

However, using the connect-by clause to formulate queries has disadvantages. First, computing such queries can entail computing multiple join operations, a process that can be very expensive to the database server processing the queries. Use of the connect-by clause is also more burdensome to users. Incorporating a connect-by clause into queries further complicates the already complex task of formulating queries.

Consequently, it is desirable to provide a mechanism that allows relational database systems to emulate hierarchically organized systems in ways that are more efficient than conventional mechanisms for this type of emulation. It is further desirable that this type of emulation be provided in a way that mitigates the complexity of formulating queries that request and return hierarchically organized data.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

A method and apparatus for accessing hierarchical information stored in a relational database system is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Described herein is a new implementation of a hierarchical index that captures the hierarchical relationship of a hierarchy emulated by a relational database system. The hierarchical index is implemented, using a database table which contains rows that serve as entries of the hierarchical index. Another table has rows that are associated with nodes in the hierarchy. Each entry in the hierarchal index maps to a row that corresponds to a node in the hierarchy. A node in the hierarchy may be a parent node with one or more child nodes. In this case, the corresponding entry in the hierarchical index contains identifiers which identify other entries in the index, where the other entries correspond to rows associated with child nodes of the parent node.

In addition, the index contains information about how users may access the rows associated with the hierarchy. The information may be used to determine the access privileges of a user during the course of performing operations that involve the index, allowing both operations and the task of determining the access privileges to be performed more efficiently overall.

Finally, a database server may use the hierarchical index to execute statements like a native index supported by the database server. The type of statements that can be supported in this way include Data Definition Language ("DDL") statements, and Data Manipulation Language ("DML") statements. Both types of statements are written in a database language, such as SQL.

System Overview

Figure 2:
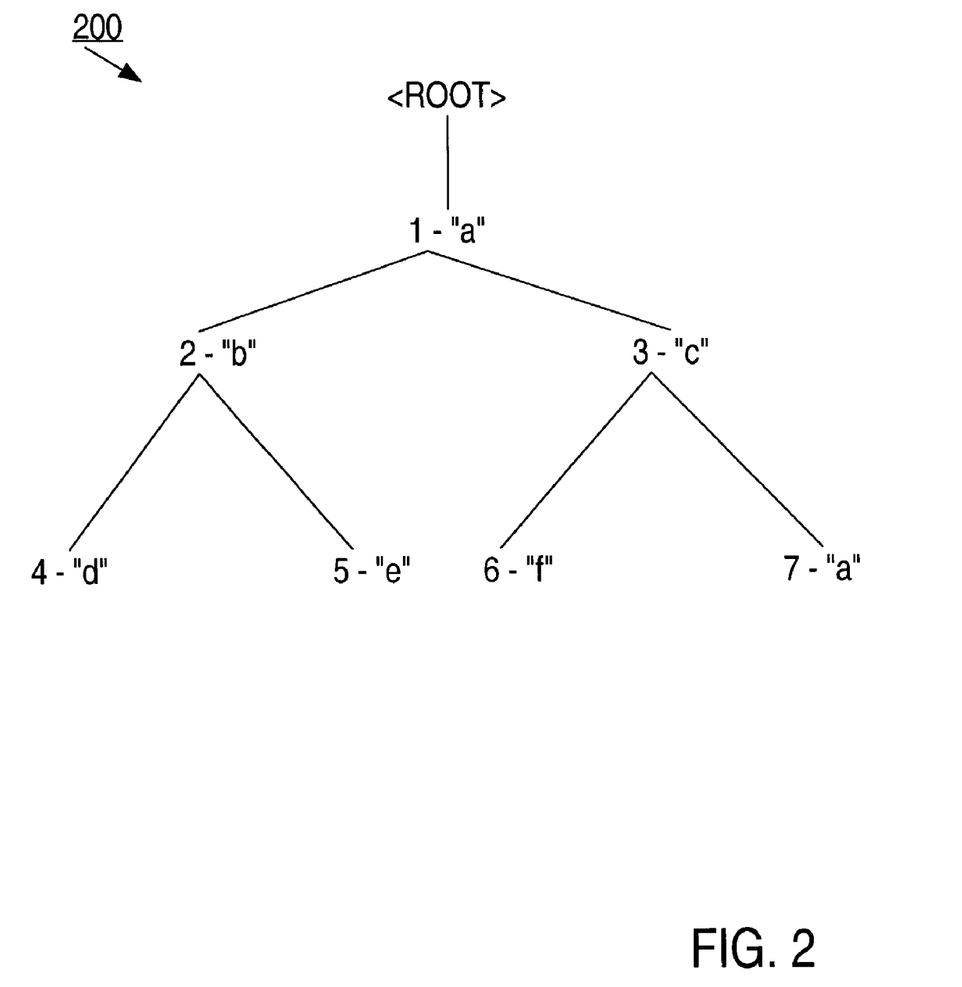
FIG. 2 is a block diagram illustrating an information hierarchy.

FIG. 2 is a block diagram that illustrates a hierarchy 200 that is used in examples that are provided herein to facilitate an understanding of embodiments of the invention. Hierarchy 200 includes eight nodes. The highest node in the hierarchy is referred to as the "root" node. The nodes at the end of each branch in the hierarchy are "leaf" nodes. The nodes between the root node and the leaf nodes are "intermediate" nodes. In the illustrated hierarchy, nodes 1, 2, and 3 are intermediate nodes, and nodes 4, 5, 6, and 7 are leaf nodes.

In an information hierarchy, the nodes correspond to information. Typically, the piece of information associated with each node will have some form of name, and some type of content. For example, in a hierarchy that corresponds to a hierarchical file system, the nodes will typically correspond to files (where a "folder" or "directory" is one type of file). Each such file will have a name, and some form of content.

Figure 3:
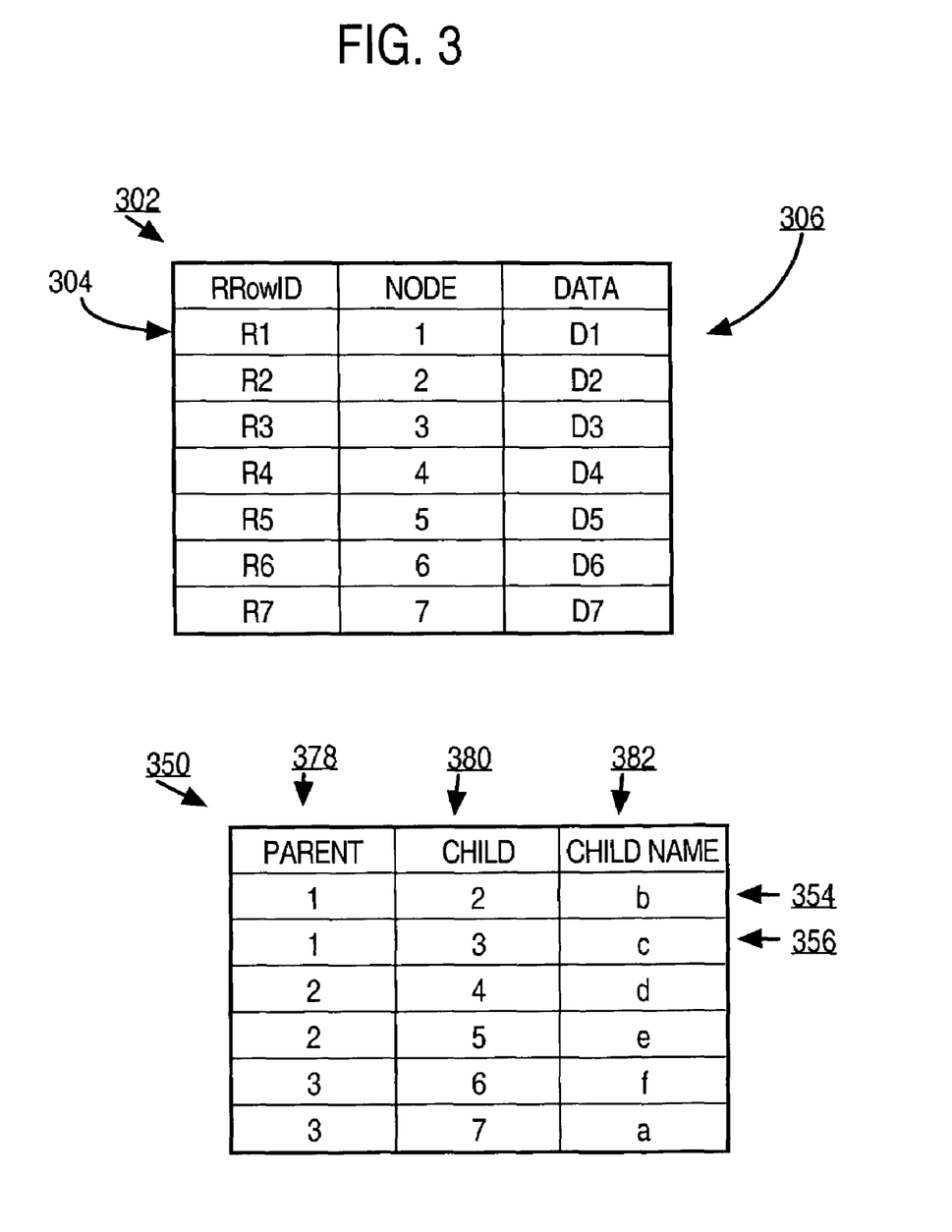
FIG. 3 is a block diagram illustrating tables that may be used to capture the information hierarchy illustrated in FIG. 2 within a relational system according to an embodiment of the invention.

FIG. 3 is a block diagram of two tables 302 and 350 that may be used to represent hierarchy 200 in a relational database system. Table 302 includes one row for each node in hierarchy 200. A RowID psuedo-column RRowID has RowIDs that identify a row in table 302. Column NODE contains logical identifiers (herein "node ids") that uniquely identify a node in hierarchy 200. Column NODE may be a primary key that contains primary key values. Column DATA contains values representing data associated with a node. The row for a given node in table 302 includes the row's RowID, a node id identifying the node, and the data associated with the node. For example, row 304, which is identified by RowID R1, corresponds to node 1, data 306 associated with node 1 and its content. Rows in table 302 are herein referred to by their respective RowID.

Table 350 includes rows that each define a parent-child relationship in hierarchy 200. Columns PARENT and CHILD contain node identifiers. Column CHILD NAME contains the "child names" of a child for a particular parent-child relationship in hierarchy 200. For the particular parent-child relationship defined by a row in table 350, column PARENT contains a node id that identifies the parent node, column CHILD contains a node id that identifies the child node, and CHILD NAME contains the child name for that child under the particular parent-child relationship. Similarly, rows 354 and 356 respectively indicate that node 1 is the parent of nodes 2 and 3. CHILD NAME in row 354 specifies that the name of node 2 under the parent-child relationship represented by row 354 is "b."

Although not explicitly depicted in hierarchy 200, a node may have multiple parents in an hierarchy, and for each of these parent-child relationships, a different child name. For example, node 4 may be a child of node 1, and for this parent-child relationship, have a child name Z. Thus, the path represented by this parent-child relationship is "/a/Z". For the row of table 350 representing this parent-child relationship, PARENT contains 1, CHILD contains 4, and CHILD NAME contains Z.

Child name is one example of a link property, that is, a property specific to a parent-child relationship rather than the parent or the child. In another embodiment, table 350 may contain other columns for other link properties. For example, the link property may designate whether or not a parent-child relationship can be seen by any one else other than those with the highest level of access authority for a system (e.g. system administrators). Or, a link property may designate that a parent-child relationship is fixed, that is, it cannot be changed by end users. The rows in table 350 for such fixed parent-child relationships may be cached in volatile memory indefinitely because they very unlikely to be changed.

Hierarchical Index

Figure 4:
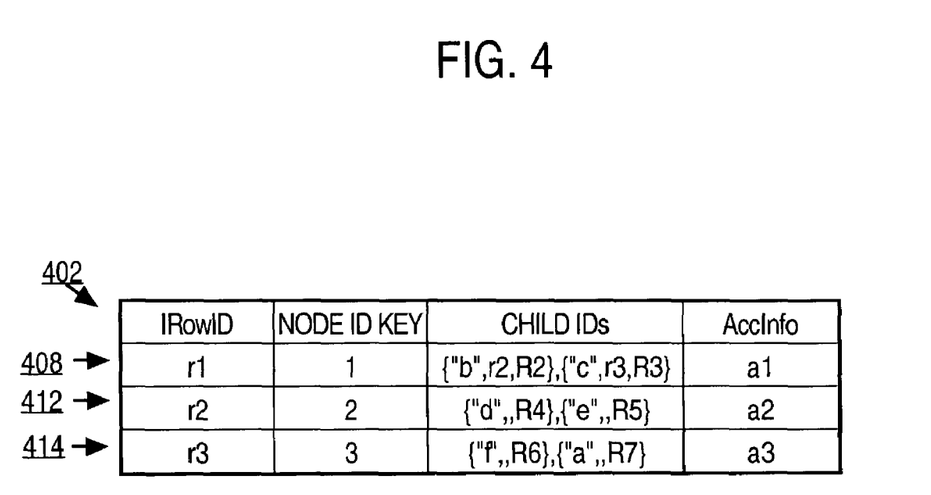
FIG. 4 is a block diagram of a database table that serves a hierarchical index according to an embodiment of the present invention.

FIG. 4 shows a hierarchical index 402 that describes the hierarchical relationship of hierarchy 200 as represented by tables 302 and 350, according to an embodiment of the present invention. Index 402 is a table with multiple columns and multiple rows. Each row is an index entry. For each intermediate node in hierarchy 200, its corresponding entry in index 402 identifies the index entries of the child nodes of the intermediate node, and rows in table 302 that correspond to the child nodes. Index 402 contains no entries for leaf nodes.

Column IRowID in index 402 is a RowID psuedo-column that has RowIDs that identify an entry in index 402. Column NODE ID KEY contains the primary key values for index 402, the key values being the node ids in column NODE of table 302. Column CHILD IDs contains a collection of composite-ids, each composite-id containing a child name of a child node, a RowID identifying the entry, if any, in index 402 coffesponding to the child node, and a RowID identifying the row in table 302 corresponding to the child node. CHILD IDs may be implemented as, for example, a column of the data type "character large binary object". The data type allows, for a given entry, many composite-ids to be stored in a column. Column AccInfo contains access information for accessing nodes and their corresponding rows in table 302.

For a given node and its corresponding entry in index 402, the entry contains composite-ids that identify the other entries in index 402 that correspond to the child nodes of the given node, but only if those child nodes are intermediate nodes. For example, in entry 408, column NODE ID KEY contains the node id value 1. Thus, entry 408 corresponds to node 1. Child IDs in entry 408 contains composite-ids {"b",r2,R2} and {"c",r3,R3}, which identify entries 412 and 414, each of which correspond to intermediate nodes 2 and 3, respectively. Node 2 is a child of node 1. Composite-id {"b",r2,R2} specifies that row R2 in table 302 corresponds to child node 2, and that its child name is "b". In entry 412, NODE ID KEY contains the value 2, and Child IDs contains {"d",,R4},{"e",,R5}. Composite-ids {"d",,R4} and {"e",, R5} identify no entry in index 402, indicating that the corresponding child nodes are leaf nodes. Composite-id {"d",,R4} identifies as a child node the node corresponding to row R4 in table 402, which is node 4. Node 4 is a leaf node.

Tables 302 and 350 and index 402 capture information of the hierarchy 200 in a relational format. While embodiments of the invention shall be described hereafter through the use of examples that refer to hierarchy 200, tables 302 and 350, and index 402, such embodiments are merely exemplary. The way a relational database system stores information about hierarchies may vary from implementation to implementation, and the present techniques are not limited to any particular implementation.

Exemplary Traversal of Index

Index 402 may be traversed to access nodes in hierarchy 200 in response to requests based on the nodes' position within hierarchy 200. For example, suppose a query is issued requesting data associated with the child nodes of the node identified by the path "/a/b", node 2. Such a query may be formulated using operators described in U.S. patent application Ser. No. 10/260,138, filed on equal day herewith, entitled OPERATORS FOR ACCESSING HIERARCHICAL DATA IN A RELATIONAL SYSTEM, by Nipun Agarwal, Ravi Murthy, Eric Sedlar, Sivasankaran Chandrasekar and Fei Ge. To get to the child nodes, the index entry corresponding to node named "a", entry 408, is accessed. The entry in index 402 corresponding to next node in the path is determined by examining composite-ids in column CHILD IDs of entry 408. Composite-id {"b",r2, R2}, which contains a child name matching the next node in the path "/a/b", identifies RowID r2, the RowID of entry 412. Next, entry 412 is accessed. The composite-ids in CHILD IDs of entry 412 are {"d",,R4} and {"e",,R5}, which identify rows in table 302 associated with node 2 as child nodes, rows R4 and R5. Rows R4 and R5 correspond to nodes 4 and 5, identified by the paths "/a/b/d" and "/a/b/f", respectively. These rows are accessed using their RowIDs to retrieve the requested data in the rows. Composite-id {"b", r2,R2}, which contains a child name matching the next node in the path "/a/b", identifies RowID r2, the RowID of entry 412. Next, entry 412 is accessed. The composite-ids in Child IDs of entry 412 are {"d",,R4} and {"e",,R5}, which identify rows in table 302 associated with node 2 as child nodes, rows R4 and R5. Rows R4 and R5 correspond to nodes 4 and 5, identified by the paths "/a/b/d" and "/a/b/f", respectively. These rows are accessed using their RowIDs to retrieve the requested data in the rows.

Benefits of Storing Many Row IDs in One Cell

An advantage of index 402 is that data that identifies index entries and rows in table 302 of the child nodes of a parent node can reside within a single data block. A data block is an atomic unit of storage for storing database data managed by a database, and is the unit of data at the lowest level of granularity that may be loaded into volatile memory from static storage. Accessing a data block can be an expensive operation because the data block may have to be loaded from static storage into volatile memory. Significant efficiency gains can be realized for a process that accesses data blocks by reducing the number of data blocks needed to perform the process. Thus, the ability to store all the data needed to identify the index entries and rows in table 302 of the child nodes of a parent node is an advantageous feature, because then only one data block need be accessed to get this data.

This feature benefits in particular a process referred to as "path resolution" or as "resolving a path". Path resolution refers to the set of operations performed to determine what one or more entities are identified by a path. It is a common and important function performed by any system that accesses hierarchically organized data based on a path. Therefore, improving its efficiency is particularly important.

For example, to resolve the path "/a/b", the index entry corresponding to node a, entry 408, is accessed. The composite-ids in Child IDs of entry 408 are evaluated to determine that they include r2, which identifies the entry for node b. Thus, the path identifies a valid node, and row R4 in table 302 is a data structure to which path "/a/b" is resolved.

As demonstrated above, resolving path "/a/b" requires accessing one index entry and one data block for each level in the path, except the last. Thus, the number of data blocks accessed to resolve the path using index 402 is linearly proportional to the number of levels in the path.

This linear relationship exists when the Row IDs needed to identify all child node index entries can be stored in one data block, a condition that is likely true for hierarchically organized data typically stored on database servers. For example, a typical database server may have an average block size of 8 k ("kilobytes") and an average RowID size of 16 bytes. A data block can therefore store enough RowIDs to identify the entries of approximately 500 child nodes. This threshold number of child nodes is unlikely to be exceeded for a given parent in most hierarchies represented by a database server.

Another advantageous feature of index 402 it that it is structured and managed as a table by a database server. This allows index 402 to be concurrently accessed using powerful native features that enable efficient concurrent access to database tables. An example of such a feature is row level concurrency. In row level concurrency, to access a row in a table a process need only lock the row. Another form of concurrency that can be less efficient is table level concurrency. In table level concurrency, to access a row in a table or any portion thereof, a process must lock the whole table. In general, multiple concurrent processes can be executed more efficiently if they can access the same data structure concurrently. Under row level concurrency, multiple processes can access a table concurrently if they access different rows in the table. A process that locks a row does not block a process that requires access to another row. However, with the table level concurrency, to access a row a process must lock the whole table, blocking other processes requiring access to any row in the table, even those processes that need to access a row not needed or accessed by the process locking the table.

Pre-Commit Cache

Transactions executing on a database system change parent-child relationships and the rows in tables 302 and 350 that represent the relationships. In general, when a transaction changes a row, the row is locked before the transaction is committed. For example, if the parent-child relationship between node 1 and node 2 is changed by a transaction, then row 354 and entry 408 are locked. The lock of row 354 blocks other processes attempting to change the parent-child relationship between node 1 and node 2. However, the lock to entry 408 blocks processes attempting to not only change this parent-child relationship but also others, i.e. the parent child relationship between node 1 and node 3. For purposes of changing a parent-child relationship, the locking of rows on table 402 occurs at the parent level, while the lock of the rows on table 350 occur at a lower level of granularity at the parent-child relationship level.

To reduce the collateral blocking effect of changing rows in table 402 that are made to reflect parent-child relationship changes, and to improve concurrency, the locking of rows changed by a transaction is deferred until the transaction is about to commit. The changes to rows made by a transaction are tracked in a "pre-commit cache". Only when the transaction is about to commit are the changed rows locked, thereby reducing the overall time the rows are locked for a transaction and the collateral blocking affects that would otherwise occur.

Using Access Control Data While Traversing Hierarchical Index

Column AccInfo contains access control data used to determine user access privileges, that is, what way, if any, may a user, group of users, or class of users, access a node in hierarchy 200. For a particular entry in index 402, AccInfo contains data used to determine user privileges for a node and the row corresponding to the node. The data may take the form of data that explicitly specifies user access privileges, data that refers to a source of access control data, or a combination thereof.

According to an embodiment of the present invention, access control data is managed and maintained by a database server for accessing table 350 and other tables managed by the database server. Such access control data is referred to herein as table access control data. Table access control data for a table may be stored at least in part in, for example, one or more columns of the table.

The data stored in AccInfo reflects (i.e. is consistent with) table access control data for table 350. Thus, for a particular entry, the access control data stored in AccInfo indicates user access privileges that are consistent with user privileges specified by table access control data for the row. For example, if data in AccInfo for entry 408 indicates that a user can read but not write data in node 1, table access control data for row R1 indicates that the same user can read but not write data to row R1.

According to an embodiment of the present invention, access control data that governs access to hierarchical and relationally organized data can be implemented as described in U.S. patent application Ser. No. 10/259,176, filed on equal day herewith, entitled MECHANISM FOR UMFORM ACCESS CONTROL IN A DATABASE SYSTEM, by Ravi Murthy, Eric Sedlar, Nipun Agarwal, Sam Idicula, and Nicolas Montoya.

The user access privileges defined by access control data in AccInfo include, without limitation, the right to read content of a node, to write content of the node, to define user privileges for the node, to delete the node, and to traverse the node. The right to traverse a node refers to the ability to perform any type of access to the descendants of the node. For example, with respect to node 1, a user has a right to traverse node 1 but not read or write its content. The user may access the children of node 1, which are node 2 and 3, but may not read the content of node 1, i.e. read row R1.

Storing access control data in AccInfo enables user access privileges to be determined more efficiently in the course of performing operations that involve traversing index 402, such as path resolution. Because the access control data is stored in the entries of index 402, which are already being accessed during traversal, there is no need to get access control data from another source, such as access control data stored in table 302, except for the final node in a path. For example, to resolve the path "/a/b", entry 408 is accessed but not entry 412, which contains access control information in AccInfo for node 2, the final node in the path. Instead, this information is obtained from table 302.

Path resolution may be performed as an atomic operation that includes not only identifying a node specified by a path but determining whether a user has a particular user privilege needed to perform a particular type of operation involving the node. Access control data in AccInfo allows this type of path resolution to be performed more efficiently. For example, while traversing hierarchical index 402 to resolve path "a/b/c" for a user, entry 408 is accessed. Data in AccInfo is examined to determine that the user may traverse node 1. Next, entry 412 is accessed. Data in AccInfo for entry 412 is examined to determine that the user may not traverse node 2. Thus, the user cannot see any of the children of node 2, including the child node identified by the path, which is node 3. Path resolution is complete and does not need continued traversal of index 402. Thus, path resolution was performed while not only avoiding accessing table access control data for table 350, but also by avoiding completely traversing entries corresponding to each path element of the path.

Storing access control data in an hierarchical index is one example of a type of index that may contain access control information. Other types of indexes, such a B-tree indexes, may contain access control information about the items indexed. The access control information stored in the other types of indexes may be used to improve processes that involve both index traversal and access control. Therefore, the present invention is not limited to storing access control information in hierarchical indexes.

Integration of Hierarchical Index

An advantage of native indexes supported by a database server is that the database server may use them to execute database statements that do not specify whether and how to use the index. This ability relieves the user from onerous task of formulating queries that specify operations needed to use the index. For example, a database server receives a request to execute a query that does not specify whether or how to use an index. The database server then generates an execution plan that defines operators, definitions of a set of operations that carry out a task, and an order in which to execute the operators. The operators include an operator for accessing a particular index. When generating an execution plan, the database server evaluates various factors that affect efficiency. Once an execution plan is generated, the database executes the plan's operators, including the operator for accessing the index.

When the database server is able to automatically use an index to execute a database statement without need for the database statement to specify whether or how to use the index, the index or its use is referred to as being "below the database language layer", or "below the SQL layer".

To support an index in a manner that is below the database command layer, software for a database server may be programmed to support the index in this way. Another way to enable this type of support is through the use of a mechanism referred to as extensible indexing. Extensible indexing is described in U.S. Pat. No. 5,893,104, entitled *Extensible Indexing*, issued on Apr. 6, 1999 to Jagannathan Srinivasan, Ravi Murthy, Chin Hong, Samuel DeFazio, and Anil Nori, the contents of which are herein incorporated by reference. Extensible indexing allows a database server, which does not have built-in support to support an index type, to extend its index capabilities to support a new index type, by registering the index type and index routines (e.g. object methods) invoked by the database server to use and support the indexes that are instances of the index type. In general, index routines include routines that create, delete, and modify the definition of indexes (DDL index routines), routines that modify the data in existing indexes (DML index routines), routines that retrieve data from existing indexes (query processing index routines), and routines that are called to generate and evaluate execution plans (query optimization index routines).

Extensible indexing allows the database server to perform, automatically and below the database language layer, the operations needed to use and support an index of a particular index type. For example, a database server receives a DDL statement to drop or truncate table 350. The DDL statement references table 302 but not index 402. When the database server executes the DDL statement, the index is automatically dropped or truncated by invoking and executing a DDL index routine. When a database server receives a query, it evaluates and generates an execution plan, and in the course of doing so, invokes query optimization index routines that participate in evaluating whether and how to use index 402. Once it generates the execution plan, the database server executes the execution plan, invoking query processing index routines as needed to carry out the execution plan.

To create an index, a user issues a create index DDL statement. According to an embodiment of the present invention, a create index statement for a hierarchical index specifies as arguments a resource table and a link table. A resource table, such as table 302, contains content of nodes (logically, physically, or combination thereof) in a hierarchy, such as hierarchy 200. A link table, such as table 350, links rows that represent parent nodes to rows that represent child nodes of the parent nodes. A database server defines a table object type for resource tables (resource table type), and a table object type for link tables (link table type). A create index DDL command for a hierarchical index specifies a table that is an instance of the resource table type and a table that is an instance of the link table type. The link table type defines column attributes (e.g. PARENT and CHILD table 302) that hold node ids for mapping a parent node to a child node. The resource table type defines a column attribute for the node ids (e.g. NODE in table 302). A DDL index routine for creating a hierarchical index takes arguments of the type resource table type and link table type.

Hardware Overview

Figure 5:
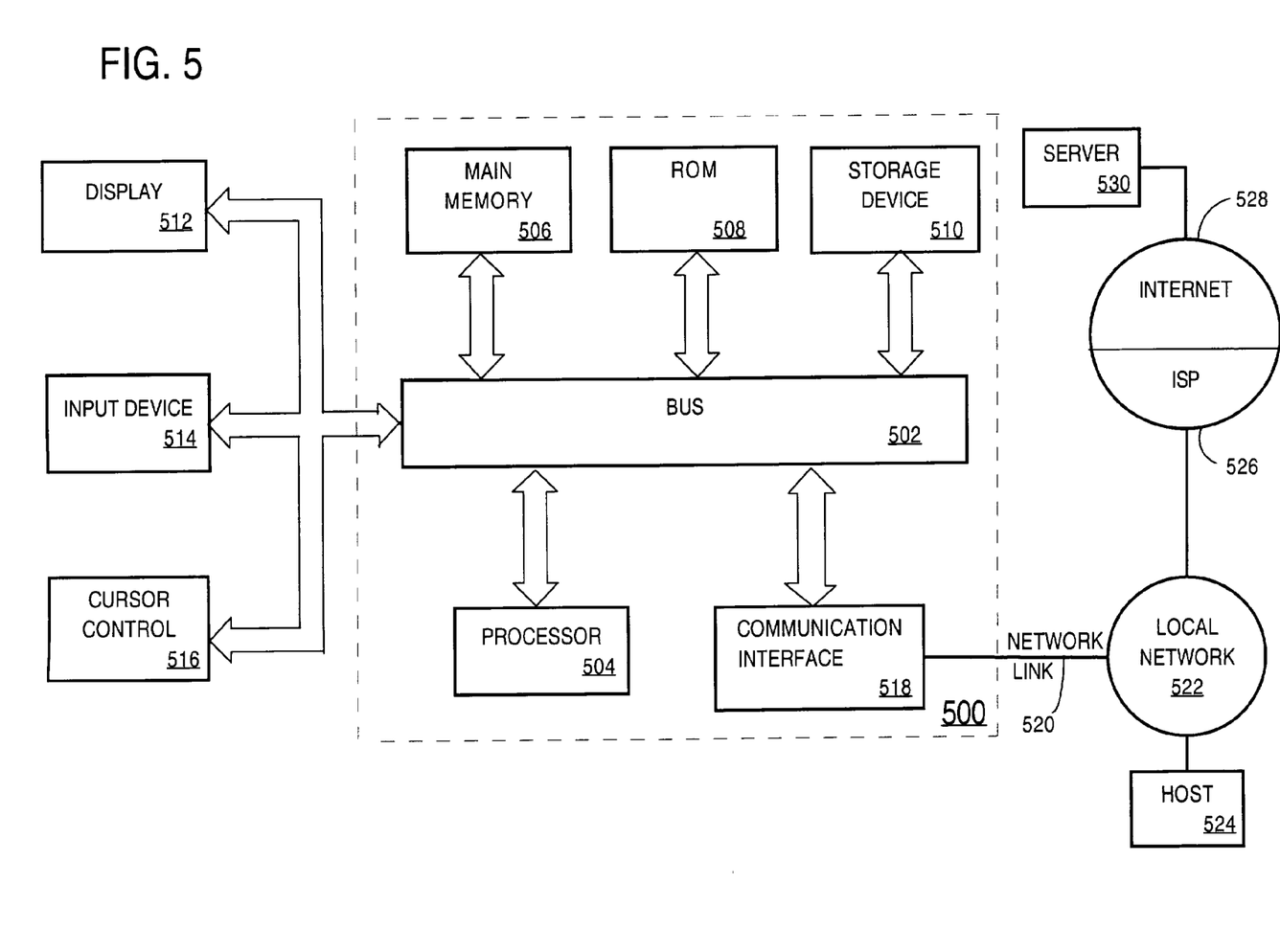
FIG. 5 is a block diagram of a system on which embodiments of the invention may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hardwired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522.

For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method used for resolving a path name that has a sequence of path elements, comprising the steps of:
   traversing an index to resolve said path name;
   wherein said index comprises at least a first entry that corresponds to a first path element of said sequence of path elements, wherein said first entry corresponds to a first node in an information hierarchy, wherein said first entry includes data identifying a second entry in said index that corresponds to a second node that is a child of said first node;
   wherein said second entry corresponds to a second path element from said sequence of path elements;
   wherein access control data in the second entry indicates access privileges of one or more users for an item associated with the second path element;
   wherein traversing said index further comprises:
      accessing in said first entry said data identifying said second entry in said index;
      based on the data accessed in said first entry identifying the second entry, accessing the second entry that corresponds to said second path element from said sequence of path elements; and
      based on examining said access control data accessed in the second entry, determining and storing the access privileges of the item associated with the second path element.

2. The method of claim 1, wherein:
   at least one path element follows said second path element in said sequence; and
   the steps further include attempting to access an entry in said index that corresponds to said at least one path element only if said user may access said item according to said access privileges.

3. The method of claim 1, wherein said item is a row in a table that contains rows that correspond to nodes in a hierarchy.

4. The method of claim 1, wherein the step of determining whether a user may access the item includes determining whether the user is permitted to access an item associated with any descendant node of the second node.

5. The method of claim 1,
   wherein each entry of a plurality of entries within said index is associated with an identifier that uniquely identifies said each among said plurality of entries; and
   wherein said data identifying said second entry in said index comprises the identifier that uniquely identifies said second entry.

6. The method of claim 1, wherein said access privileges further comprise any one of:
   the right to read content of an item;
   the right to write content of an item;
   the right to define user privileges for an item;
   the right to delete an item; or
   the right to traverse an item.

7. A computer-readable storage medium storing one or more sequences of instructions used for resolving a path name that has a sequence of path elements, wherein execution of the one or more sequences of instructions by one or more processors causes the one or more processors to perform the steps of:
   traversing an index to resolve said path name;
   wherein said index comprises at least a first entry that corresponds to a first path element of said sequence of path elements, wherein said first entry corresponds to a first node in an information hierarchy, wherein said first entry includes data identifying a second entry in said index that corresponds to a second node that is a child of said first node;
   wherein said second entry corresponds to a second path element from said sequence of path elements;
   wherein access control data in the second entry indicates access privileges of one or more users for an item associated with the second path element;
   wherein traversing said index further comprises:
      accessing in said first entry said data identifying said second entry in said index;
      based on the data accessed in said first entry identifying the second entry, accessing the second entry that corresponds to said second path element from said sequence of path elements; and
      based on examining said access control data accessed in the second entry, determining and storing the access privileges of the item associated with the second path element.

8. The computer-readable storage medium of claim 7, wherein:
   at least one path element follows said second path element in said sequence; and the steps further include attempting to access an entry in said index that corresponds to said at least one path element only if said user may access said item according to said access privileges.

9. The computer-readable storage medium of claim 7, wherein said item is a row in a table that contains rows that correspond to nodes in a hierarchy.

10. The computer-readable storage medium of claim 7, wherein the step of determining whether a user may access the item includes determining whether the user is permitted to access an item associated with any descendant node of the second node.

* * * * *